United States Patent [19]
Kashiwagi

[11] Patent Number: 5,962,993
[45] Date of Patent: Oct. 5, 1999

[54] HORIZONTAL S-SHAPE CORRECTION CIRCUIT

[75] Inventor: Shigeru Kashiwagi, Noda, Japan

[73] Assignee: Victor Company of Japan, Ltd., Yokohama, Japan

[21] Appl. No.: 08/906,856

[22] Filed: Aug. 6, 1997

[30] Foreign Application Priority Data

Aug. 7, 1996 [JP] Japan .................................. 8-224514
Sep. 5, 1996 [JP] Japan .................................. 8-255434

[51] Int. Cl.$^6$ ............................... H04N 3/23; G09G 1/04
[52] U.S. Cl. ......................... 315/371; 315/387; 315/408
[58] Field of Search .................................. 315/366, 370, 315/408, 371, 387; 348/806

[56] References Cited

U.S. PATENT DOCUMENTS

| | | | |
|---|---|---|---|
| 4,501,995 | 2/1985 | Olmstead et al. | 315/371 |
| 4,533,855 | 8/1985 | Willis et al. | 315/370 |
| 4,673,984 | 6/1987 | Kikuchi et al. | 358/190 |
| 4,709,193 | 11/1987 | Dietz | 315/408 |
| 4,859,915 | 8/1989 | Decraemer | 315/371 |
| 5,155,417 | 10/1992 | Tateishi | 315/371 |
| 5,315,216 | 5/1994 | Van Den Herik | 315/370 |
| 5,517,090 | 5/1996 | Bando | 315/370 |
| 5,530,488 | 6/1996 | Rilly et al. | 348/704 |
| 5,661,375 | 8/1997 | Haferl | 315/411 |
| 5,666,033 | 9/1997 | Vingtrois | 315/408 |
| 5,703,444 | 12/1997 | Teuling et al. | 315/371 |

FOREIGN PATENT DOCUMENTS

| | | |
|---|---|---|
| 0146345 | 6/1985 | European Pat. Off. . |
| 0549044 | 6/1993 | European Pat. Off. . |
| 08079554 | 3/1996 | Japan . |
| 08204982 | 8/1996 | Japan . |
| 9-93457 | 4/1997 | Japan . |
| 2244630 | 12/1991 | United Kingdom . |

Primary Examiner—Edward P. Westin
Assistant Examiner—Shane R Gardner
Attorney, Agent, or Firm—Jacobson, Price, Holman & Stern, PLLC

[57] ABSTRACT

The turn-off period of the FET (111) is adjusted by changing the output pulse width of the MM (113) according to the horizontal deflection frequency, to adjust the total capacitance value of the S-shape correcting capacitor group in one horizontal deflection period, that is, to execute an optimum S-shape distortion correction according to each horizontal deflection frequency. The timing at which the electronic switch element (111) is turned off in a first half of the horizontal scanning period is continuously and variably controlled on the basis of an external control signal (Vg). The auxiliary S-shape correcting capacitor (110) of the S-shape correcting capacitor group is controllably turned on or off by the electronic switch element (111), to execute an optimum S-shape distortion correction.

2 Claims, 10 Drawing Sheets

HORIZONTAL S-SHAPE CORRECTION CIRCUIT

BACKGROUND OF THE INVENTION

1. Field of the Invention

The present invention relates to a horizontal S-shape correction circuit suitable for a display unit using an image receiving tube, and more specifically to a technique for reducing M-shape distortion such that the horizontal linearity is reduced at the central portion of an image during a wide angle deflection, and further, when a plurality of sorts of horizontal deflection periods are USED, for correcting the other image distortions such as S-shape distortion of an optimum horizontal linearity, inner pin cushion distortion, etc. for each horizontal deflection period.

Further, the present invention relates to a horizontal S-shape correction circuit suitably used for a display unit so designed as to be operative at various horizontal deflection frequencies. The horizontal S-shape correction circuit according to the present invention can automatically set an optimum horizontal deflection frequency so that the S-shape distortion correction of the horizontal linearity can be optimized for each of a plurality of the horizontal deflection frequencies.

2. Description of the Related Art

Conventionally, when an image receiving tube having a relatively wide flat image receiving surface and a wide angle deflection is used, the horizontal linearity distortion has a tendency of M-shape distortion such that the distortion is reduced at the central portion of the image receiving surface, as shown by solid line in FIG. 1. This tendency is prominent in particular in the wide image receiving tube with an aspect ratio (vertical and horizontal ratio) of 9:16, so that there exists a need of improving this problem.

FIG. 2 shows an example of the improved circuits, which is composed of a horizontal deflecting coil 1, an S-shape correcting capacitor 2, and a secondary resonance circuit 3 for correcting the M-shape distortion. In general, however, since the secondary resonance circuit 3 is not used, an electron beam of the image receiving tube is deflected right and left, when a saw tooth horizontal deflection current flows through a series circuit composed of the horizontal deflecting coil 1 and the S-shape correcting capacitor 2.

In FIG. 2, the linearity thereof can be corrected by changing the beam extension toward the right and left relative to the central portion of the image receiving surface, that is, by adjusting the capacitance value of the S-shape correcting capacitor 2. In this case, however, as shown by dashed lines and dot-dashed lines in FIG. 1, it is impossible to remove the central shrinkage portion by adjusting only the capacitance of the correcting capacitor 2. This is because there exists a relatively big difference between the optimum current waveform and the current waveform adjustable by depending upon the operation of only the S-shape correcting capacitor 2.

To overcome this problem, the secondary resonance circuit 3 is added to correct the M-shape distortion. The secondary resonance circuit 3 is composed of a coupling capacitor 4, a resonance capacitor 5, and a resonance coil 6, which can resonate at a frequency twice higher than that of the horizontal deflection frequency. In this case, since the voltage across the S-shape correcting capacitor 2 changes from a parabolic waveform (obtained when the secondary resonance circuit is not connected) as shown by a solid line in FIG. 3 to a waveform (obtained when the secondary resonance waveform is superposed upon the parabolic waveform) as shown by a dashed line in FIG. 3, with the result that the M-shape distortion as shown by the solid line shown in FIG. 1 can be corrected.

Further, when the display unit is used as a display terminal of a computer, various horizontal deflection frequencies are usually needed according to the set resolution of the computer signals.

FIG. 4 shows a related art example of correcting the S-shape distortion used for the display terminal of a computer. In FIG. 4, an auxiliary capacitor group composed of capacitors 7-1, 7-2 and 7-3 is added to the S-shape correcting capacitor 7. Further, each end of each capacitor of the auxiliary capacitor group is grounded through each of three electronic switches 8-1, 8-2 and 8-3, respectively. Further, these electronic switches are controllably turned on or off, respectively in response to three control signals applied externally.

In FIG. 4, when the horizontal deflection frequency is the highest, all the electronic switches 8-1 to 8-3 are turned off, and the capacitance of the main S-shape correcting capacitor 7 is so decided that an appropriate correction can be obtained by only the S-shape correcting capacitor 7. Further, when the horizontal deflection frequency is reduced, the electronic switches 8-1, 8-2 and 8-3 are changed from turn-off to turn-on in sequence, to connect each auxiliary capacitor 7-1, 7-2 and 7-3 in parallel to the main S-shape correcting capacitor 7 in sequence. Here, the total capacitance value of all the S-shape correcting capacitors is set to a value suitable for the horizontal frequency at that moment.

In this method, however, since the optimum frequency decided by the total capacitance is limited by the number of the electronic switches, the frequency is usually corrected only approximately, so that the correction quality inevitably deteriorates. On the other hand, although the correction quality can be improved by increasing the number of combinations of both the switches and the S-shape correcting capacitors, in this case, however, the circuit scale inevitably increases.

Further, in FIG. 4, it is possible to add the aforementioned secondary resonance circuit 3 for the M-shape correction. In this case, however, since the values of the coil and capacitor of the secondary resonance circuit 3 must be switched whenever the horizontal frequency changes, the circuit scale is further increased.

On the other hand, in addition to the above-mentioned horizontal linearity distortion, the image receiving tube having a wide angle deflection and a flat image receiving surface involves a problem related to inner pin cushion distortion as shown in FIG. 5. This distortion implies such a phenomenon that even if the side pin cushion is corrected so that the vertical lines are straight on both right and left ends on the screen, since the pin cushion remains at the intermediate portion thereof, the vertical lines are curved inward at the central portion of the screen surface.

This distortion indicates that the horizontal linearity of both sides extends largely in the scanning lines near the central portion of the screen, as compared with the upper and lower portions of the screen. Therefore, it is necessary to apply a strong S-shape correction at the central portion, as compared with that at the upper and lower ends thereof. However, it has been so far very difficult to adjust the horizontal S-shape correction rate according to the vertical position.

Further, when the horizontal amplitude is changed largely (e.g., under scanning or over scanning of an image), even if the optimum S-shape correction can be made for the normal horizontal amplitude, there exists a problem in that the S-shape correction is too sufficient in the case of the under scanning but insufficient in the case of the over scanning. Of course, although it may be considered to switch the values of the S-shape correcting capacitors according to the scanning rate by use of the switch group as shown in FIG. 4, in this case, however, the circuit is further complicated to that extent.

As described above, in the prior art technique, when a further accurate S-shape correction is required or when an appropriate S-shape correction is needed for each of various horizontal deflection frequencies, there exists a problem in that the circuit scale is huge for the horizontal S-shape correction including the M-shape correction. In addition, it is impossible to obtain an optimum correction all over the corresponding frequency ranges. To overcome this problem, it is necessary to develop new S-shape correcting means for changing the correction rate continuously, without depending upon the switching operation as is conventional.

Further, with respect to the inner pin cushion distortion correction, it is necessary to use S-shape correcting means for changing the correction rate continuously according to the vertical position. Therefore, there exists a need of realizing a simple and loss-less circuit for executing the above-mentioned continuous and variable S-shape correction.

Further, as is well known, when an image receiving tube having a relatively flat image receiving surface and a wide angle deflection is used, it is possible to obtain a correct horizontal linearity only when the S-shape corrected current waveform is used (i.e., the current slope is reduced on the right and left side as compared with the central scanning portion), without simply passing only the saw tooth waveform through the horizontal deflecting coil. For this purpose, in the prior art circuit, an S-shape correcting capacitor is inserted in series to the horizontal deflecting coil, so that the above-mentioned purpose can be obtained by the resonance operation.

However, in the case where the horizontal deflection frequency changes according to the set resolution as in the computer display terminal, it is impossible to cope with this problem by use of only a single value of the S-shape correcting capacitor, so that it has been necessary to set the value of the S-shape correcting capacitor to an optimum value according to the horizontal deflection frequency. Therefore, the value of the S-shape correcting capacitor has been so far switched by a method as shown in FIG. 6.

FIG. 6 shows a related art horizontal deflection output circuit for switching the S-shape correction capacitance value, in which a deflecting coil current Iy is passed through a horizontal deflecting coil 1 according to a driving pulse Vd synchronized with the horizontal deflection frequency of an input signal (applied from a front stage (not shown)). Here, the reference numeral 7 denotes an S-shape correcting capacitor. When the normal single horizontal deflection frequency is used, the following auxiliary S-shape capacitor group 7-1, 7-2 and 7-3 are all not necessary, so that only the S-shape correcting capacitor 7 is used alone.

On the other hand, when the various horizontal deflection frequencies are used, a plurality of auxiliary S-shape correcting capacitors 7-1, 7-2 and 7-3 (auxiliary S-shape correction capacitor group) connected in parallel to the main S-shape correcting capacitor 3 are added. Here, each end of each auxiliary S-shape correcting capacitor is grounded via each of electronic switches 8-1, 8-2 and 8-3. Further, these electronic switches are controllably turned on or off on the basis of a plurality of external control signals Vsw. In FIG. 6, when the horizontal deflection frequency is the highest, all the electronic switches 8-1 to 8-3 are turned off, and the capacitance of the main S-shape correcting capacitor 7 is so decided that an appropriate correction can be obtained by use of only the capacitor 7. Further, when the horizontal deflection frequency is reduced, the electronic switches 8-1, 8-2 and 8-3 are changed from turn-off to turn-on in sequence, to connect each of the three auxiliary capacitors 7-1, 7-2 and 7-3 in parallel to the main S-shape correcting capacitor 7 in sequence. Here, the total capacitance value of all the S-shape correcting capacitors is set to a value suitable for the horizontal frequency at that moment.

Here, these electronic switches are controllably turned on or off on the basis of the external control signals Vsw. These control signals Vsw are so set that the most appropriate electronic switch circuits can be turned on according to the sort of the input signal (according to the sort of the horizontal deflection frequency of the input signal applied to the display unit).

In this prior art method shown in FIG. 6, however, since the total capacitance value of the S-shape correcting capacitors can be only changed stepwise, the optimum horizontal deflection frequency is inevitably limited to the number of the electronic switches. That is, since the frequency is usually corrected approximately (except when the optimum horizontal deflection frequency is obtained), the correction quality inevitably deteriorates. On the other hand, although the correction quality can be improved by increasing the number of combinations of both the switches and the S-shape correcting capacitors, in this case, however, the circuit scale inevitably increases.

Therefore, when a technique is realized such that the S-shape correction rate can be changed continuously and further that the optimum S-shape correction rate can be decided automatically according to the horizontal deflection frequency, there exists a large advantage from the standpoints of the performance improvement and the simplification of the circuit scale.

SUMMARY OF THE INVENTION

With these problems in mind, therefore, it is the first object of the present invention to provide a horizontal S-shape correction circuit, which can change the horizontal S-shape correction rate continuously, while correcting the M-shape distortion simultaneously.

Further, the second object of the present invention is to provide a horizontal S-shape correction circuit, which can execute the optimum S-shape correction automatically according to each of various horizontal deflecting frequencies, in spite of a simple circuit construction.

To achieve the above-mentioned object, the present invention provides a horizontal S-shape correction circuit, comprising: an S-shape correcting capacitor group connected in series to a horizontal deflecting coil; and an electronic switch element turned off in a first half of a horizontal scanning period and turned on in a horizontal blanking period according to an external control signal, for controllably turning on or off a part of capacitors of said S-shape correcting capacitor group; and wherein the external control signal comprises a first control signal for adjusting a timing at which said electronic switch element is turned off in the first half of the horizontal scanning period, according to waveform in a vertical deflection period.

Here, it is preferable that the external control signal further comprises a second control signal for bringing a timing at which said electronic switch element is turned off in the first half of the horizontal scanning period toward a central portion of the horizontal scanning period, with increasing horizontal deflection period.

Further, the present invention provides a horizontal S-shape correction circuit, comprising: an S-shape correcting capacitor group connected in series to a horizontal deflecting coil; and an electronic switch element turned off in a first half of a horizontal scanning period and turned on in a horizontal blanking period according to an external control signal, for controllably turning on or off a part of capacitors of said S-shape correcting capacitor group; and wherein the external control signal comprises a first control signal for adjusting a timing at which said electronic switch element is turned off in the first half of the horizontal scanning period, according to horizontal deflection amplitude.

Here, it is preferable that the external control signal further comprises a second control signal for bringing a timing at which said electronic switch element is turned off in the first half of the horizontal scanning period toward a central portion of the horizontal scanning period, with increasing horizontal deflection period.

Further, the present invention provides a horizontal S-shape correction circuit, comprising: an S-shape correcting capacitor group connected in series to a horizontal deflecting coil; an electronic switch element for controlling connection of a part of capacitors of said S-shape correcting capacitor group, in such a way as to be turned off in a first half of a horizontal scanning period and turned on in a horizontal blanking period; a detecting circuit for detecting an amplitude of a waveform of a signal generated by said S-shape correcting capacitor group; a comparing circuit for comparing an output of said detecting circuit with a reference voltage; and a timing control circuit for adjusting the timing at which said electronic switch element is turned off in the first half of the horizontal scanning period, according to an output of said comparing circuit.

Further, it is preferable that the reference voltage is changed according to a horizontal deflection frequency.

DETAILED DESCRIPTION OF THE PREFERRED EMBODIMENTS

Figure 1:
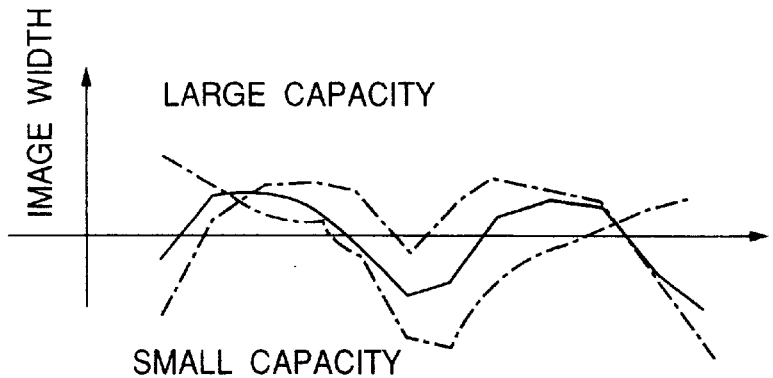
FIG. 1 is a graphical representation showing an example of the related art S-shape correction.

A first embodiment of the horizonal S-shape correction circuit according to the present invention will be described hereinbelow with reference to FIG. 7. In the drawing, a horizontal deflecting coil 101 is the same as the deflecting coil 1 of the prior art circuit shown in FIG. 2. A horizontal deflection output circuit 109 applies a horizontal output pulse Vp to one end of the horizontal deflecting coil 101, so that a saw tooth current Iy flows through the horizontal deflecting coil 101. Further, this horizontal deflection output circuit 109 executes the wellknown horizontal deflection output operation on the basis of a driving pulse Vd applied from a front stage (not shown) of the same circuit 109.

An S-shape correcting capacitor group connected to the other end of the horizontal deflection coil 101 is composed of a main capacitor 107 grounded directly, and an auxiliary capacitor 110 turned on or off by an electronic switch element 111 connected to the ground. However, being different from the prior art circuit shown in FIG. 4, the electronic switch 111 is not fixedly turned on or off when the handled frequency is decided, but repeatedly turned on or off in one horizontal deflection period.

Here, the electronic circuit is composed of an electronic switch element (i.e., FET) 111 and a diode 112 connected in parallel to and between a drain and a source of the switch element 111. As this electronic switch element, various switching elements such as bipolar transistor, IGBT, etc. can be used. Here, although the diode 112 is connected to flow current in a direction opposite to that of the FET 111, when a sufficient current can flow between the drain and the source of the FET 111 in the reverse direction, it is possible to eliminate this diode 112. A mono-stable multivibrator (referred to as MM, hereinafter simply) 113 is triggered by a pulse Vh having the horizontal deflection period. A square pulse Vg outputted by this MM 113 is applied to a gate of the FET 111. Here, the square pulse Vg outputted by the MM 113 is an external control signal for controlling the turn-on and -off operation of the FET 111. The horizontal deflection period pulse Vh is formed in such a way that a constant phase relationship can be kept with respect to the horizontal output pulse (horizontal blanking pulse) Vp, which can be formed easily by waveform shaping the driving pulse Vd or the horizontal output pulse Vp.

Figure 7:
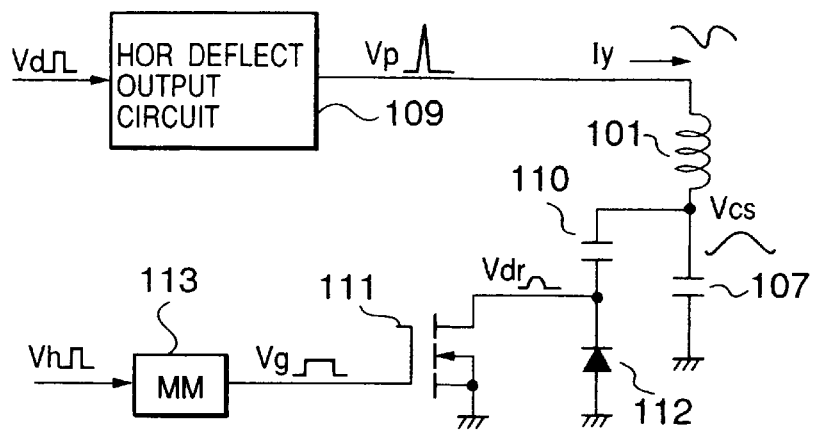
FIG. 7 is a circuit diagram showing a first embodiment of the S-shape correction circuit according to the present invention.
Figure 8A:
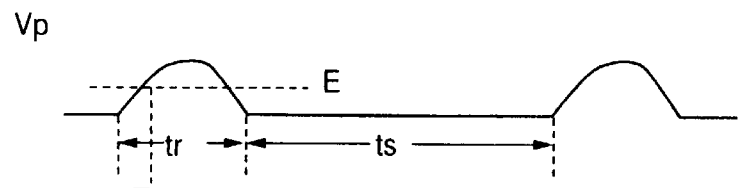
FIGS. 8a to 8f are waveform diagrams for assistance in explaining the operation of the S-shape correction circuit shown in FIG. 7.

FIGS. 8a to 8f are waveform diagrams for assistance in explaining the operation of the circuit shown in FIG. 7. First, FIG. 8a shows the horizontal output pulse Vp, in which the pulse portion corresponds to the horizontal blanking period tr and the flat portion corresponds to a horizontal scanning period ts (i.e., horizontal blanking period tr+horizontal scanning period ts=horizontal deflection period).

Figure 8B:

FIG. 8b shows the trigger pulse Vh applied to the MM 113. As already explained, since it is necessary to keep the phase relationship between the trigger pulse Vh and the horizontal output pulse Vp, this trigger pulse Vh is a square pulse having a pulse width corresponding to the duration in which the horizontal output pulse Vp exceeds a constant level E. Although a circuit for forming this pulse Vh is not shown, this circuit can be obtained easily by use of a comparator for comparing the horizontal output pulse Vp (or a pulse whose voltage is changed to an appropriate level) with a dc voltage E.

Figure 8C:

Here, the rise point of the square pulse Vh is determined as time T1. Therefore, the MM 113 is triggered at this time point T1 to generate the square pulse Vg as shown in FIG. 8c. The pulse period tmm of the output square pulse Vg of the MM 113 can be changed by moving the operating conditions of the MM 113, so that a fall time point T2 of the square pulse Vg can be adjusted freely.

Figure 8D:

Further, during the period tmm in which this output square pulse Vg is at the high level, the FET 111 is conductive between the drain and the source thereof. Therefore, as shown in FIG. 8d, the drain voltage Vdr of the FET 111 is roughly zero during this period tmm.

At time point T2, when the FET 111 changes from turn-on to turn-off, a half sine wave signal develops at the drain of the FET 111 by the resonance operation by the horizontal deflecting coil 101 and the S-shape correcting capacitor 107. After a half cycle of this sine wave (i.e., the time tdr) has elapsed, when the drain voltage Vdr reaches the zero level at time point T3, the diode 112 is changed to a conductive state automatically. Therefore, the voltage Vdr of a cathode of this diode 112 (a junction point with the drain of the FET 111) is returned to the zero level beginning from this time point T3.

Figure 8E:
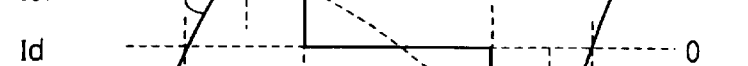

At this time, the current Idr flowing through the FET 111 and the current Id flowing through the diode 112 become as shown in FIG. 8e. Here, if the FET 111 is always kept turned on, the current Idr is of saw tooth waveform in the same way as with the horizontal deflecting coil current Iy, as shown by a dashed line in FIG. 8e. In this case, however, since both the FET 111 and the diode 112 are turned off only during the time tdr, the actual current waveform becomes as shown by a solid line in FIG. 8e. Here, the positive portion of the current waveform is the drain current Idr of the FET 111, and the negative portion thereof is the current Id of the diode 112.

Figure 8F:

As described above, when the FET 111 and the diode 112 are turned off only during the period tdr, the voltage Vcs as shown in FIG. 8f can be developed at the main S-shape correcting capacitor 107. In other words, when the FET 111 or the diode 112 is turned on, since the total capacitance of the S-shape correcting capacitance increases, the waveform of the voltage Vcs is of parabolic wave having a small amplitude as shown by I and III in FIG. 8f. However, during the period tdr (at which both the FET 111 and the diode 112 are turned off), since only the capacitor 107 operates as the S-shape correcting capacitor, the resonance frequency of the resonance circuit rises, so that the amplitude thereof increases during this period as shown by II in FIG. 8f.

Here, the voltage V1 across the horizontal deflecting coil 101 represents the differential value (i.e., a gradient) of the current Iy flowing therethrough. On the other hand, since the output pulse Vp is zero at least during the horizontal scanning period ts, V1=−Vcs during this period ts. Therefore, the voltage Vcs shown in FIG. 8f represents an opposite-direction gradient of the current Iy flowing through the horizontal deflecting coil. When this voltage Vcs is high, the gradient thereof is sharp.

Figure 2:
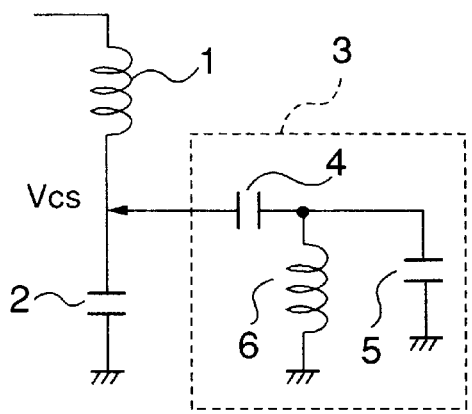
FIG. 2 is a circuit diagram showing an example of related art S-shape correction circuit.
Figure 3:
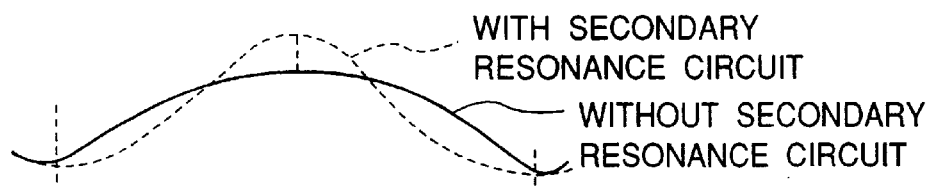
FIG. 3 is a waveform diagram for assistance in explaining the operation of the circuit shown in FIG. 2.

Therefore, the fact that the value Vcs increases in the vicinity of the central portion during the scanning period as shown in FIG. 8f indicates that the gradient of the current Iy is sharp in the vicinity of the central portion; in other words, that the scanning speed is high, with the result that it is possible to effectively correct the M-shape distortion such that the image width is narrowed at the central portion of the screen, as shown in FIG. 1. In this case, being different from the method of simply adding the secondary resonance circuit to the correcting capacitor 2 as shown in FIG. 2, since the correction exerts the influence upon only the central portion of the screen; that is, since the right and left side portions of the screen are not subjected to the influence of the correction, it is possible to execute more accurate M-shape distortion correction.

Further, the voltage Vcs shown in FIG. 8f has two inflection points at times T2 and T3. In this case, however, since the voltage Vcs represents the gradient of the current Iy as already explained, as far as the voltage value Vcs does not jump before and after these time points T2 and T3, it is understood that the current Iy can be formed smoothly at almost the same gradient. Therefore, even if an image scrolled in the horizontal direction passes through these points T2 and T3, there exists no such a problem that the image changes abruptly or discontinuously.

Successively, the case will be considered where the width of the square pulse Vg is further widened as shown by a dashed line in FIG. 8c, with the result that the time point at which the pulse Vg changes from the high level to the low level is further brought close to the scanning center as shown by time T21 in FIG. 8c. In this case, since the period during which the FET 111 and the diode 112 are both turned off is shortened from tdr to tdr1, as shown by the dashed line in FIG. 8d, the wave height of the pulse Vdr is small.

As described above, the fact that the pulse width of the pulse Vdr can be adjusted by shifting the time T2 decided according to the output pulse width tmm of the MM 113 (the same as shifting the timing at which the FET 111 is turned off) implies that the correction rate of the M-shape distortion shown in FIG. 1 can be finely optimized, so that it is possible to execute a more ideal M-shape distortion correction.

As described above, in the first embodiment, it is possible to execute a more fine M-shape distortion correction, as compared with the prior art method, by adjusting the output pulse width tmm of the MM 113, in spite of a circuit construction simpler than that of the prior art circuit.

Figure 4:
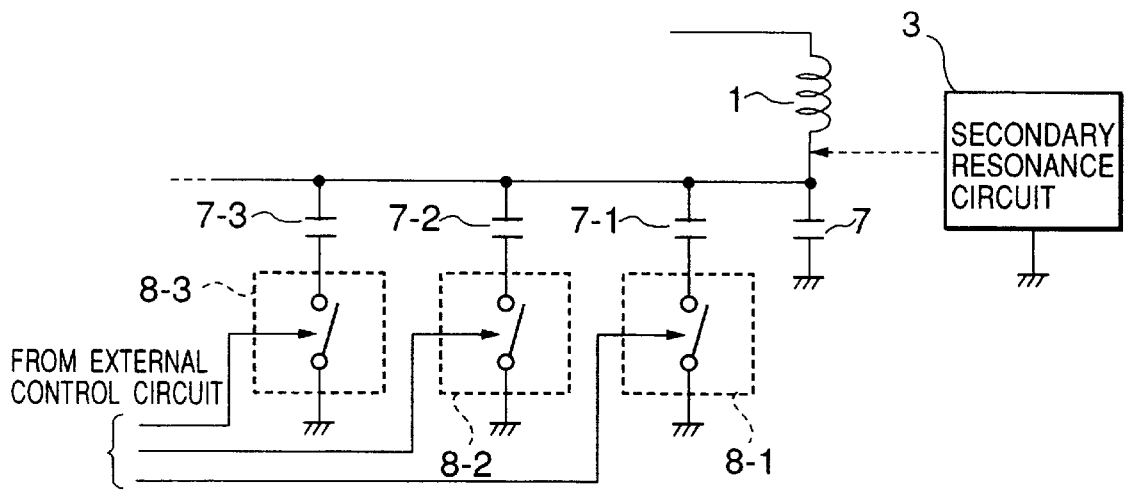
FIG. 4 is a circuit diagram showing another example of related art S-shape correction circuit.

Successively, one of the other important advantages of the present invention is to apply the gist thereof to the S-shape correction corresponding to various horizontal deflection frequencies. In more detail, being different from the prior art method as shown in FIG. 4 such that the S-shape correction is switched stepwise by use of a plurality of the electronic switches, in the present invention, it is possible to change the S-shape correction rate continuously by use of a single electronic switch. In this case, as the external control signal, such a control signal is used that the timing at which the electronic switch element can be turned off at the first half of the horizontal scanning period can be brought close to the central portion of the horizontal scanning period, with increasing horizontal deflection period. In this case, for instance, such a control signal that the width of the square pulse Vg of the first embodiment shown in FIG. 7 can be varied continuously is used.

Figure 9A:
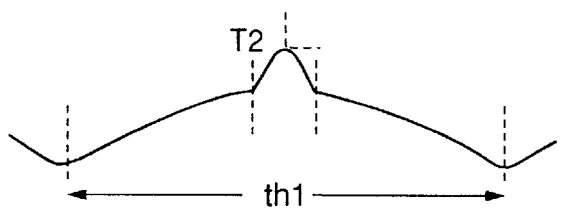
FIGS. 9a to 9c are waveform diagrams for assistance in explaining the operation of the S-shape correction circuit shown in FIG. 7.
Figure 9B:
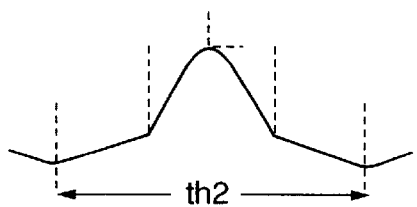
Figure 9C:
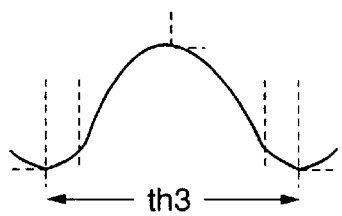

FIGS. 9a to 9c show the continuous S-shape correction according to the change of the horizontal deflection frequency. First, as shown in FIG. 9a, when the horizontal deflection period th1 is long, the time point T2 at which the FET is turned from on to off is shifted close to the central portion of the horizontal scanning period (i.e., the turn-off time of the FET 111 is shortened). In this case, since the S-shape correcting capacitors 107 and 110 are connected in parallel to each other at almost greater part of the scanning period, the resonance period of the horizontal deflecting coil is lengthened, so that it is possible to cope with the lower horizontal deflection frequency.

Further, when the horizontal deflection period is shortened down to th2 as shown in FIG. 9b, the time point T2 at which the FET is turned from on to off is set close to the start side of the horizontal scanning period, to increase the time proportion in which the FET 111 is turned off; that is, to shorten the total resonance period for the S-shape correction. Further, when the horizontal deflection period is shortened to the minimum value th3 as shown in FIG. 9c, the time point T2 at which the FET is turned from on to off is set further close to the start side of the horizontal scanning period, to turn off the FET 111 in the greater part of the scanning period. In this case, the resonance period of the S-shape correction can be decided almost by the capacitor 107.

In FIGS. 9a to 9c, although the three optimum horizontal deflection periods have been explained at only three points, as far as the time position of T2 is changed, it is possible to obtain an optimum horizontal deflection period among a plurality of the horizontal deflection frequencies.

Figure 10:
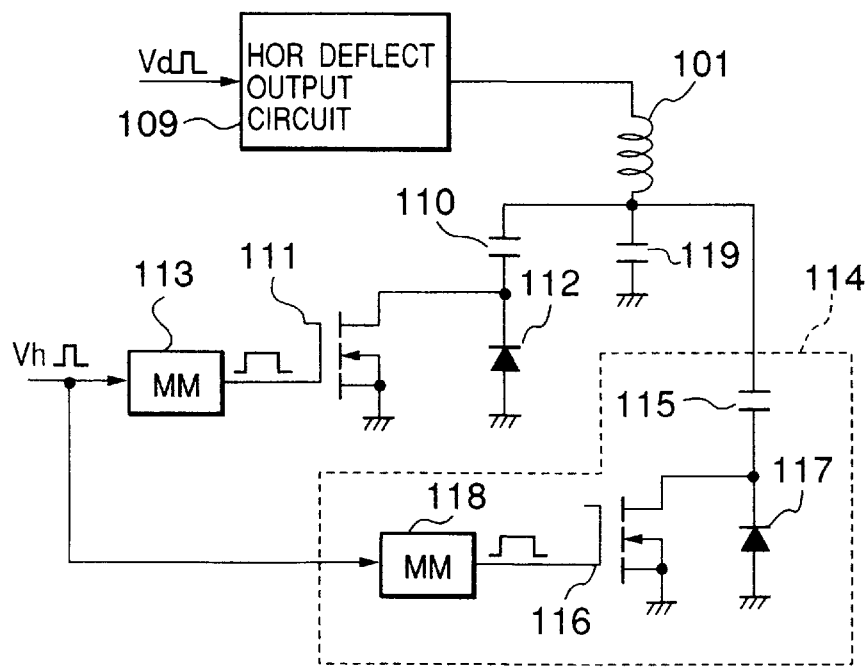
FIG. 10 is a circuit diagram showing a second embodiment of the S-shape correction circuit according to the present invention.

Further, in FIG. 9a in which the longest horizontal deflection period th1 is shown, it is possible to correct the M-shape distortion effectively by setting the turn-off period of the FET 111 in only the central portion of the horizontal deflection period th1. In this case where the deflection period is long as shown in FIG. 9c, however, since the S-shape correction can be decided almost all over the scanning period at a single resonance frequency, the M-shape distortion correction effect the same as that shown in FIG. 9a cannot be expected. In order to solve this point, it is preferable to doubly control the S-shape correction according to the present invention, as shown in FIG. 10.

A second embodiment of the S-shape distortion correction circuit according to the present invention will be described hereinbelow with reference to FIG. 10, in which an additional M-shape distortion correction circuit 114 used to switch the S-shape correction is connected. The M-shape distortion correction circuit 114 is composed of a second auxiliary S-shape correcting capacitor 115, a second FET 116, a second diode 117 connected to the FET 116, and a second MM 118. Here, the FET 111 is turned on or off in the same way as with the case of the first embodiment as already explained with reference to FIGS. 8a to 8f and FIGS. 9a to 9c. When the horizontal deflection period is as long as th1, since the newly added FET 116 is kept turned on all over the scanning period, the capacitor 115 is connected in parallel to the main S-shape correcting capacitor 119 always kept grounded. In this case, therefore, an optimum resonance frequency is determined on the basis of the capacitance obtained by the parallel connection between the two capacitors 115 and 119.

Figure 11:
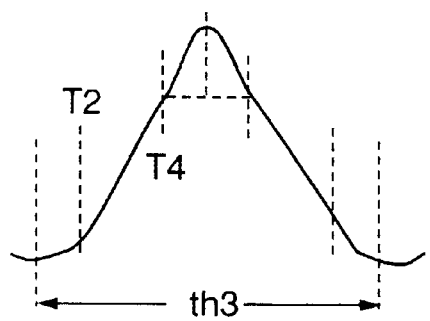
FIG. 11 is a waveform diagram for assistance in explaining the operation of the S-shape correction circuit shown in FIG. 10.

In contrast with this, when the horizontal deflection period is as short as th3 as shown in FIG. 11, the output time width of the MM 118 is set in such a way that the FET 116 is turned off at time T4 in the vicinity of the central position of the scanning. In this case, since the auxiliary S-shape capacitor 115 can be separated in the same principle as already explained, a small half sine wave is superposed upon the horizontal deflection signal beginning from time T4, so that it is possible to obtain a more appropriate M-shape distortion correction, even if the period of the horizontal deflection period is short.

Figure 5:
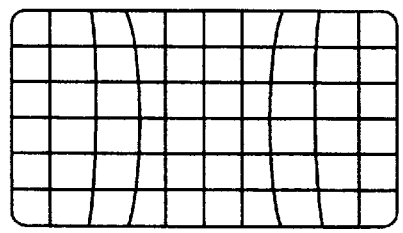
FIG. 5 is a view for assistance in explaining inner pin cushion distortion.

Further, the S-shape correction circuit according to the present invention can easily solve the problem related to inner pin cushion distortion as shown in FIG. 5. For instance, in the first embodiment shown in FIG. 7, since the S-shape correction rate can be changed by changing the width tmm of the output pulse of the MM 113, it is possible to correct the pin cushion distortion by modulating the parabolic wave signal with the vertical period by utilizing the above-mentioned change of the S-shape correction rate.

Figure 12:
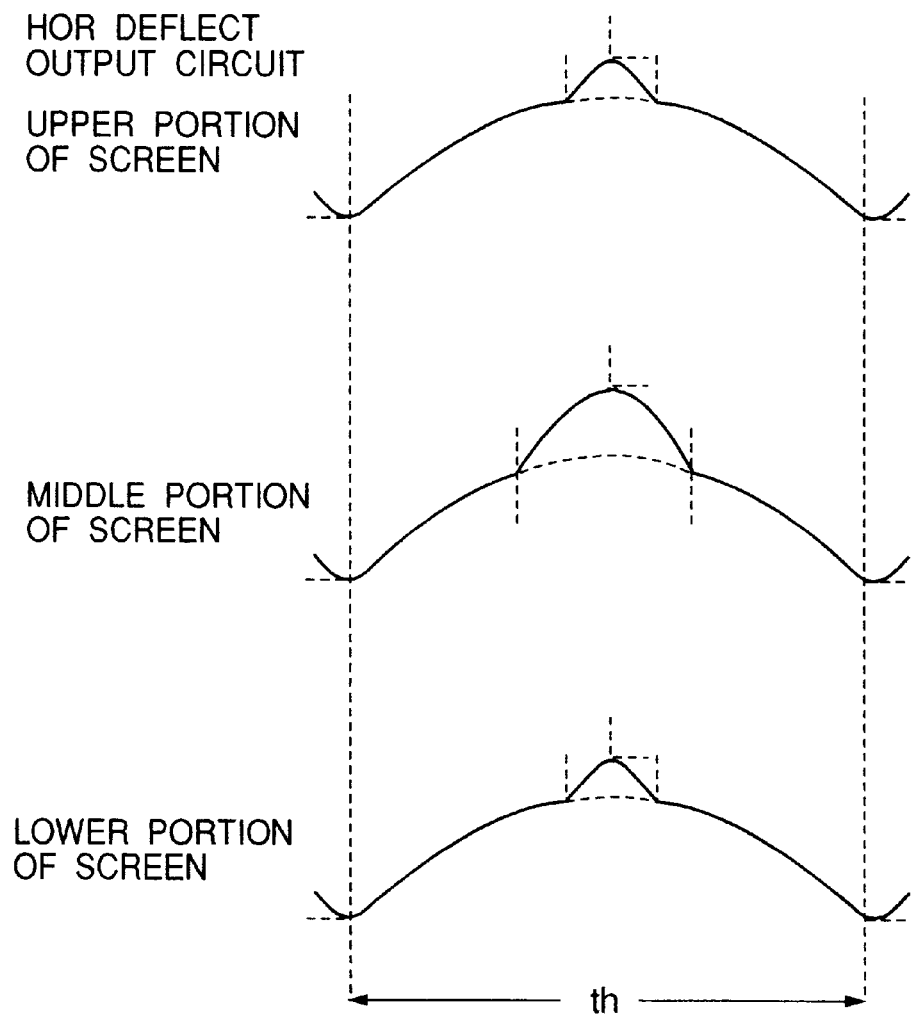
FIG. 12 is a waveform diagram for assistance in explaining the operation of the S-shape correction circuit shown in FIG. 7.

FIG. 12 shows the voltage Vcs used for correcting the S-shape distortion. As shown, the output pulse width value tmm is increased in both the upper and lower portions of a screen to decrease the S-shape correction rate of the horizontal deflection. In contrast with this, in the central portion along the vertical direction on the screen, the output pulse width value tmm is decreased to widen the region where the resonance capacitance for the S-shape capacitance can be reduced at the central portion along the horizontal direction of the screen. By doing this, since the horizontal linearity of an image can be corrected in such a way that the image can be extended at the central portion of the screen, it is possible to eliminate the distortion (inner pin cushion distortion) as shown in FIG. 5.

Figure 13:
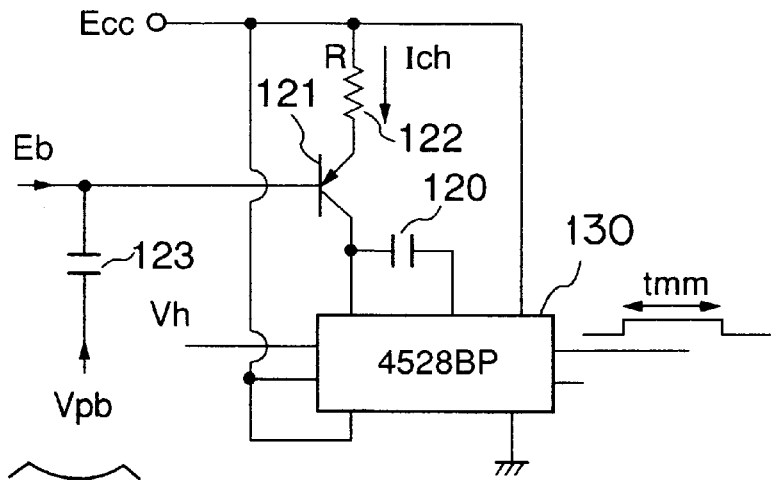
FIG. 13 is a more detailed circuit diagram showing a part of the S-shape correction circuits according to the present invention shown in FIGS. 7 and 10.

FIG. 13 shows an example of the circuit for changing the output pulse width tmm of the MM 113, which is composed of an IC element 130 of the MM 113, a time constant capacitor 120 for deciding the pulse width, a pnp transistor 121 for obtaining a constant current, an emitter resistance 122 of the transistor 121, and a coupling capacitor 123 for applying the parabolic wave signal having the vertical period.

In the circuit shown in FIG. 13, the output pulse width tmm can be decided by the value of the emitter-collector current Ich of the transistor 121 for charging the time constant capacitor 120. In other words, when the current value Ich is increased, since the charge-up speed of the capacitor 120 increases, the output pulse width tmm is shortened.

Here, the value obtained by adding the voltage (R×Ich) developed across the resistance 122 to the base-emitter voltage Vbe is equal to a potential difference between the operating supply voltage Ecc of the circuit and the base voltage Eb. Therefore, when the voltage Eb is changed by the external control, since the current value Ich changes according to the voltage Eb, it is possible to change the output pulse width tmm.

Further, when the parabolic wave Vvert having the vertical period is applied to the base terminal of the transistor 121 via the coupling capacitor 123, since the rear edge of the output square wave is shifted in phase by this parabolic wave, it is possible to correct the inner pin cushion distortion as shown in FIG. 5 by increasing the S-shape correction rate at the central portion as compared with the upper and lower portions of the screen.

Here, as already explained, when the dc current value of the base voltage Eb is changed in FIG. 13, the S-shape correction rate can be changed. Therefore, when this voltage Eb can be obtained by a front-stage horizontal deflection amplitude control circuit (not shown), it is possible to obtain an optimum S-shape correction rate according to the change of the horizontal amplitude. In other words, when the output pulse width tmm is narrowed, the period tdr is lengthened, so that the S-shape correction rate can be increased. In contrast with this, when the horizontal width is required to be reduced, the voltage value Eb is increased, to reduce the S-shape correction rate. As a result, it is possible to always execute an optimum S-shape correction according to the horizontal width value on the basis of the above-mentioned method.

Further, the above-mentioned four adjustments of the M-shape distortion correction adjustment (referred to (a) adjustment) as explained with reference to FIGS. 8a to 8f; the adjustment according to the horizontal deflection period (referred to as (b) as explained with reference to FIGS. 9a to 9c; the adjustment according to the waveform of the vertical deflection period (referred to (c) adjustment) as explained with reference to FIG. 12; and the adjustment according to the horizontal deflection amplitude (referred to as (d) adjustment can be all combined with each other appropriately as follows:

(a) adjustment+(b) adjustment; (a) adjustment+(c) adjustment; (a) adjustment+(d) adjustment; (b) adjustment+(c) adjustment; (b) adjustment+(d) adjustment; (c) adjustment+(d) adjustment; (a) adjustment+(b) adjustment+(c) adjustment; (a) adjustment+(b) adjustment+(d) adjustment; (a) adjustment+(c) adjustment+(d) adjustment; (b) adjustment+(c) adjustment+(d) adjustment; and (a) adjustment+(b) adjustment+(c) adjustment+(d) adjustment.

A third embodiment of the horizontal S-shape correction circuit according to the present invention, which can correct various horizontal deflection frequencies automatically will be described hereinbelow with reference to FIG. 14.

Figure 6:
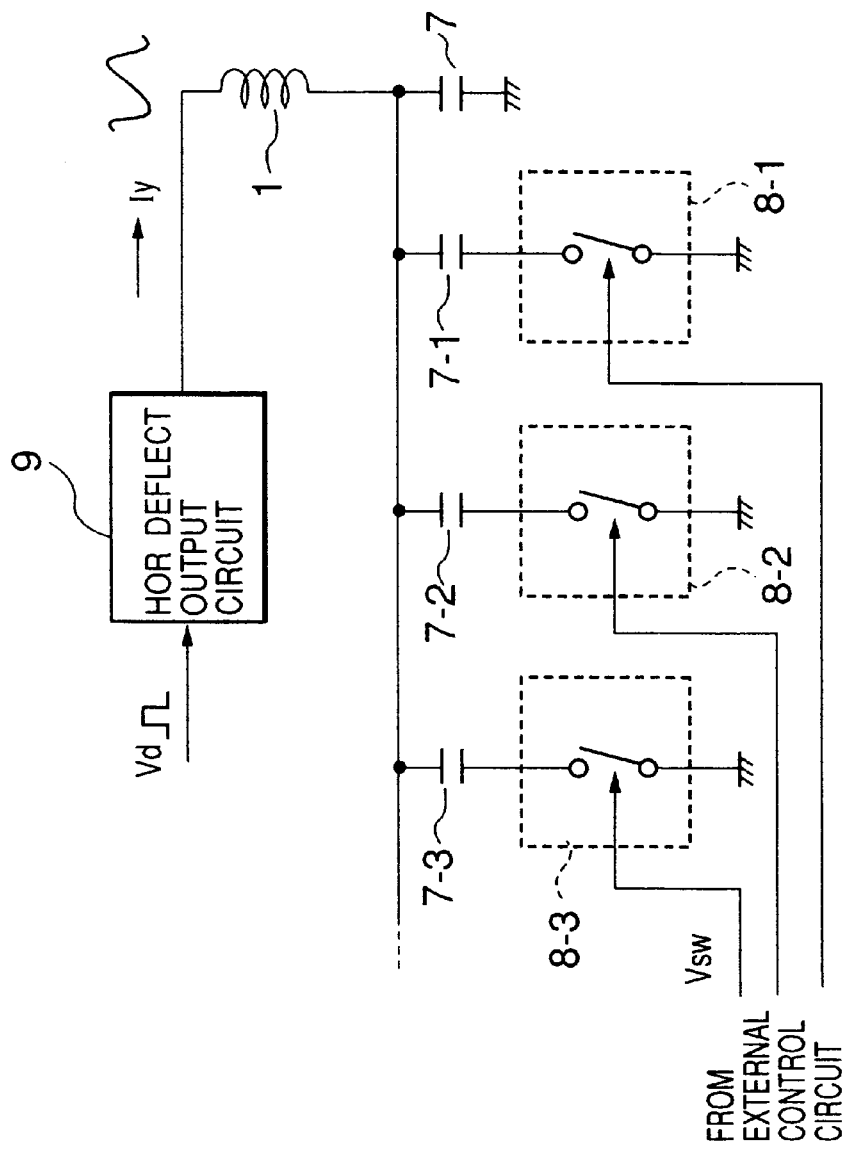
FIG. 6 is a circuit diagram showing an example of the related art S-shape correction circuit for various horizontal deflection frequencies.
Figure 14:
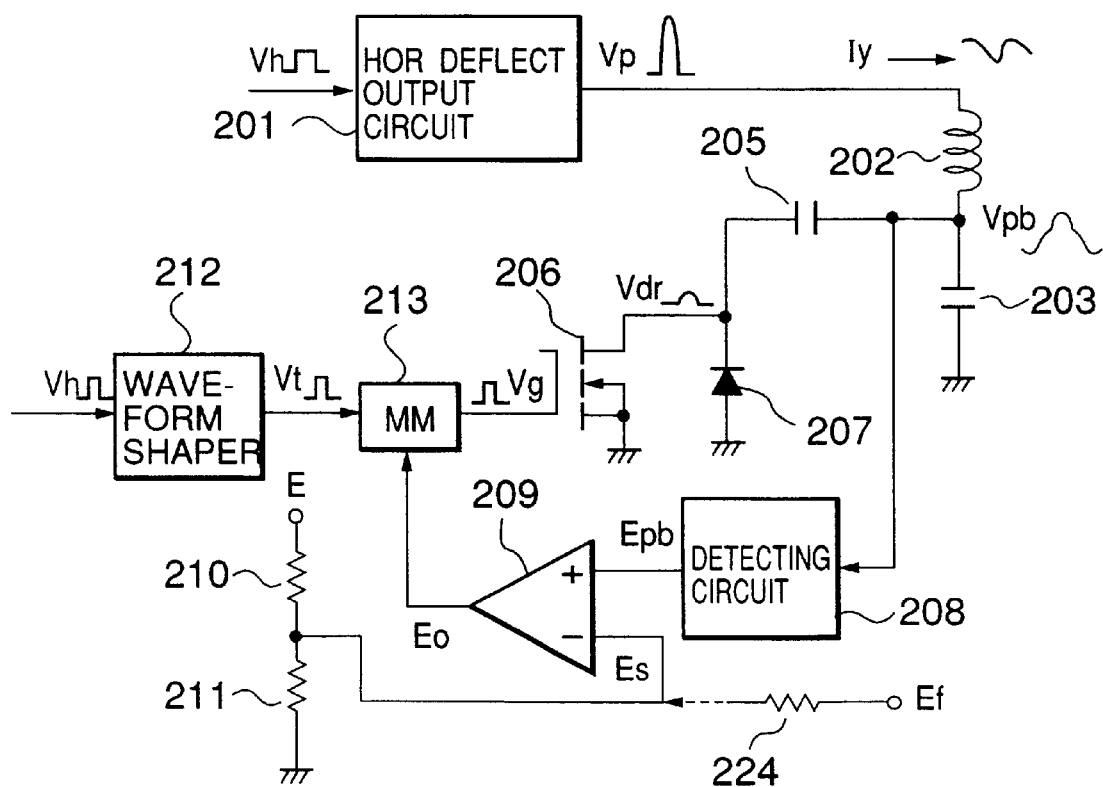
FIG. 14 is a circuit diagram showing a third embodiment of the S-shape correction circuit according to the present invention.

In FIG. 14, a horizontal deflection output circuit 201 is the same as that of the prior art circuit shown in FIG. 6. In the same way as with the case of the prior art circuit, the electron beam of an image receiving tube is deflected in the horizontal direction by passing an S-shape-corrected saw tooth wave current Iy through a series circuit of a horizontal deflection coil 202 and an S-shape correcting capacitor 203.

Being different from the prior art circuit shown in FIG. 6, the auxiliary S-shape correcting capacitor 205 is constructed by only a single capacitor. That is, the S-shape correcting capacitor group can be constructed by connecting both the S-shape correcting capacitor 203 and the auxiliary S-shape correcting capacitor in series to the horizontal deflecting coil 202.

Further, the electronic switch element is composed of an electronic switch element (i.e., FET) 206 and a diode 207 connected between the source and the drain of the FET 206. Further, a square pulse Vg is applied to the gate of the FET, to switch the turn-on or -off status of the FET in one horizontal deflection period. Further, although the diode 207 is connected to flow current in a direction opposite to that of the FET 206, when a sufficient current can flow between the drain and the source of the FET 206 in the reverse direction, it is possible to eliminate this diode 207.

On the other hand, the parabolic voltage wave signal Vhor with the horizontal deflection period develops at one end of the S-shape correcting capacitor 203. This voltage signal Vpb is given to a detecting circuit 208, to output a dc voltage Epb according to the amplitude of the voltage Vpb. Further, the voltage signal Epb is applied to one input terminal (non-inversion input terminal) of a succeeding comparator 209. Further, a reference voltage Es is obtained by dividing the dc supply voltage E by two resistors 210 and 211, and then applied to the other input terminal (inversion input terminal) of the comparator 209.

A pulse Vh related to the horizontal deflection operation is applied to a wave-form shaping circuit 212. This pulse Vh can be formed by transforming the horizontal deflection output pulse Vp generated at one end of the horizontal deflecting coil through a fly-back transformer (not shown), for instance. When the pulse Vh is applied to the wave-form shaping circuit 212, a pulse Vt obtained by slicing an apex of the voltage signal Vp (the apex of Vh) is generated from the output of the wave-form shaping circuit 212. This pulse Vt is applied to a mono-stable multivibrator (referred to as MM, hereinafter) 213 to trigger the same multivibrator. Therefore, the MM 213 outputs a square pulse Vg having a pulse width tg (a suitable or controllable duration time beginning from the trigger time). Here, the pulse width tg of this pulse Vg can be controlled by the output voltage Eo of the comparator 209. Therefore, this MM 213 is a timing control circuit for changing the timing at which the electronic switch element (i.e., FET 206) is turned on or off.

The operation of the circuit shown in FIG. 14 will be described hereinbelow with reference to waveform diagrams shown in FIGS. 15a to 15e. First, FIG. 15a shows the horizontal output pulse Vp or a pulse Vh obtained by transforming this pulse Vp, in which the pulse portion corresponds to the horizontal blanking period tr and the flat portion corresponds to a horizontal scanning period ts (i.e., horizontal blanking period tr+horizontal scanning period ts=horizontal deflection period).

Figure 15A:
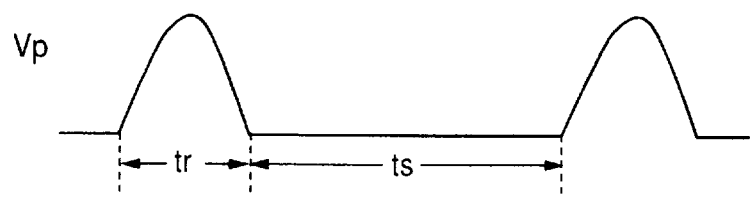
FIGS. 15a to 15e are waveform diagrams for assistance in explaining the operation of the S-shape correction circuit shown in FIG. 14.
Figure 15B:
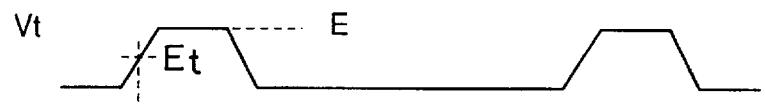
Figure 15C:
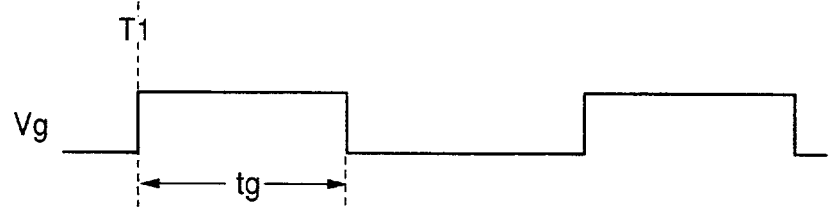

FIG. 15b shows the trigger pulse Vt applied to the MM 213, which can be obtained, as an appropriate triggering pulse to the MM, by slicing an apex of the horizontal pulse Vh shown in FIG. 15a at a voltage level of E. Since the MM 213 is triggered by the constant level Et of the pulse Vt, it is possible to form a pulse having a pulse width tg beginning from the trigger time T1. Here, since this pulse width tg can be changed according to the voltage Eo as already explained, the fall time T2 of the pulse Vg can be adjusted freely.

When this pulse Vg is kept at the high level, the drain and the source of the FET 206 is conductive. Therefore, as shown in FIG. 15d, the drain voltage Vdr of the FET 206 is roughly zero during this period tg.

At time point T2, when the FET 206 changes from turn-on to turn-off, a half sine wave signal is developed at the drain of the FET 206 by the resonance operation by the horizontal deflecting coil 202 and the S-shape correcting capacitor 203. Further, after a half cycle (i.e., time tdr) of this sine wave has elapsed, at time point T3, since the drain voltage Vdr reaches the zero level, the diode 207 is changed to a conductive state automatically. Therefore, the voltage Vdr of a cathode of this diode 207 (a junction point with the drain of the FET 206) is returned to the zero level beginning from this time point T3.

Figure 15D:
Figure 15E:
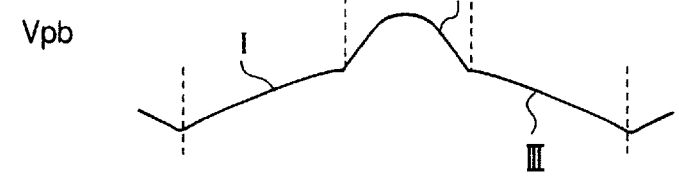

As described above, when the FET 206 is turned off and thereby a small pulse Vdr is generated at the drain thereof as shown in FIG. 15d, the voltage Vpb as shown in FIG. 15e is developed at the main S-shape correcting capacitor 203.

In other words, when the FET 206 or the diode 207 is turned on, since the total capacitance of the S-shape correction capacitance increases, the waveform of the voltage Vpb is of parabolic wave having a small amplitude as shown by I and III in FIG. 15e. However, during the period tdr (at which both the FET 206 and the diode 207 are turned off), since only the capacitor 203 operates as the S-shape correcting capacitor, the resonance frequency of the resonance circuit rises, so that the amplitude thereof increases as shown by II in FIG. 15e.

Here, the voltage V1 across the horizontal deflecting coil 202 represents the differential value (i.e., a gradient) of the current Iy flowing therethrough. On the other hand, since the output pulse Vp is zero at least during the horizontal scanning period ts, V1=−Vps during this period ts. Therefore, the voltage value Vpb shown in FIG. 15e represents an opposite-direction gradient of the current Iy of the horizontal deflecting coil. When this voltage Vpb is high, the gradient thereof is large.

Further, the voltage Vpb as shown in FIG. 15e has two inflection points at times T2 and T3. In this case, however, since the voltage Vpb represents the gradient of the current Iy as already explained, as far as the voltage value Vpb does not jump before and after times T2 and T3, it is understood that the current Iy can be formed smoothly at almost the same gradient. Therefore, even if an image scrolled in the horizontal direction passes through these points, there exists no such a problem that the image changes abruptly or discontinuously.

Successively, the operation of when the S-shape correction is executed according to various horizontal deflection frequencies fh, that is, when the horizontal deflection period th varies will be explained hereinbelow with reference to FIGS. 16a to 16c.

Figure 16A:
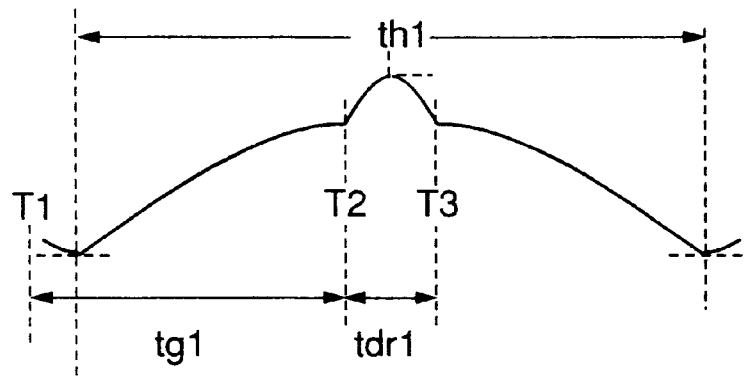
FIGS. 16a to 16c are waveform diagrams for assistance in explaining the operation of the S-shape correction circuit shown in FIG. 14.

FIG. 16a shows the voltage Vpb required when the horizontal deflection frequency is low or when the period thereof is as long as th1. In this case, the output pulse width of the MM 213 is decided as a relatively long value tg1, and further the timing at which the FET 206 is turned from on to off is delayed during a first half of the horizontal scanning period. As a result, the turn-off period tdr1 of the FET 206 is shortened. In order to obtain an appropriate S-shape correction rate, the total equivalent capacitance of the S-shape correcting capacitor group must be increased with decreasing horizontal frequency. Therefore, as shown in FIG. 16a, the time proportion of the turn-off period tdr1 of the FET 206 to the horizontal deflection period th1 is shortened in such a way that two capacitors 203 and 205 are connected in parallel to each other during the major portion of the horizontal scanning period.

Figure 16B:
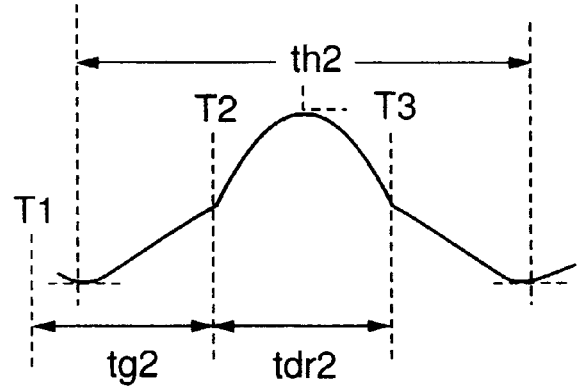

Successively, when the horizontal deflection period is further shortened as shown in FIG. 16b, the output pulse width of the MM 213 is shortened as tg2 to increase the proportion of the turn-off period tdr2 to the deflection period th2. Further, when the horizontal deflection frequency increases to near the upper limit, the output pulse width of the MM 213 is shortened as tg3 in such a way the turn-off period tdr3 occupies the major portion of the horizontal deflection period th3. In summary, in order to obtain an optimum S-shape correction rate, it is necessary to decrease the total equivalent capacitance of the S-shape correcting capacitor group with increasing horizontal deflection frequency. Therefore, the output pulse width tg of the MM 213 is reduced gradually, and thereby the time proportion of the turn-off period tdr of the FET 206 to the horizontal deflection period th is lengthened gradually. In this case, the time period in which the two capacitors 203 and 205 are connected in parallel to each other during the horizontal scanning period is shortened.

As described above, in this third embodiment, it is possible to obtain the optimum S-shape correction rate automatically according to each horizontal deflection frequency, by adjusting the turn-off period of the FET 206, that is, by changing the output pulse width of the MM 213 according to the horizontal deflection frequency. In addition, in this third embodiment, since the S-shape correction rate can be changed continuously according to the horizontal deflection frequency, it is possible to execute the most ideal correction all over the variable range of the horizontal deflection frequency. Further, in this embodiment, being different from the prior art circuit, since a plurality of the S-shape correcting capacitors and a number of electronic switches for switching these auxiliary S-shape correcting capacitors are not required, it is possible to simplify the circuit construction markedly.

As described above, in this third embodiment, the value of the output pulse tg of the MM 213 (i.e., the timing at which the FET 206 is turned from on to off) is kept always at an optimum value according to each horizontal deflection frequency. In the circuit construction shown in FIG. 14, the detecting circuit 208 is constructed in such a way that the dc voltage Epb proportional to the amplitude of the voltage Vpb can be obtained. For instance, a rectifying circuit is suitably used for this detecting circuit 208. Further, in this case, the circuit is constructed in such a way that when the voltage Epb is increased, the output pulse width tg of the MM 213 can be increased by change of the output voltage Eo of the comparator.

In this case, when the amplitude of the voltage Vpb increases and thereby the voltage Epb exceeds the voltage Es, the comparator output Eo activates the MM 213 so that the period tg can be lengthened. As a result, the turn-off period tdr is shortened to reduce the amplitude Vpb on the aforementioned principle. As a result, the amplitude of the voltage Vpb cannot be increased, so that the voltage Epb is kept constant at the same level of the voltage Es.

The fact that the amplitude of the voltage Vpb is kept constant implies that the gradient value of the current Iy is kept constant at the start, middle, and end points of the horizontal scanning period ts, that is, the waveform of the current Iy will not change. Therefore, even if the horizontal deflection frequency changes, as far as the voltage Vpb is kept constant, the S-shape correction rate will not change largely. Of course, although the gradient of the current Iy slightly changes during the scanning operation due to the fluctuations of the relative positions between times T2 and T3, it has been confirmed empirically that the fluctuations do not exert any practical harmful influence upon the effect of the S-shape correction.

Figure 16C:
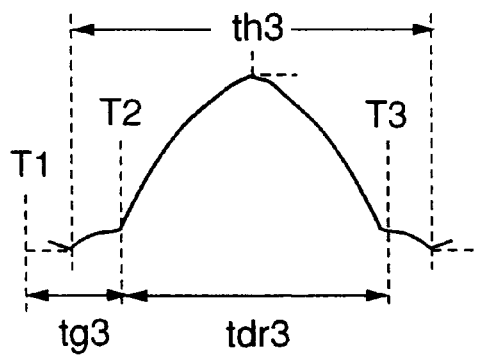

Further, as understood by FIGS. 16a to 16c, the voltage value Vpb across the capacitor 203 projects at the central portion thereof, which is different from the prior art simple parabolic waveform. This implies that it is possible to effectively correct the M-shape distortion (the central portion of an image is shrank), which has been so far difficult to be removed, as far as the parabolic waveform is used.

Figure 17:
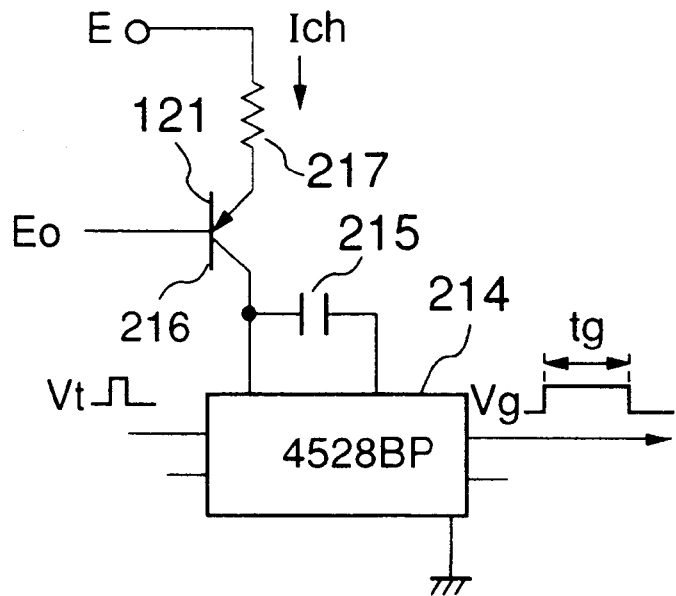
FIG. 17 is a more detailed circuit diagram showing a part of the S-shape correction circuit according to the present invention shown in FIG. 14.

FIG. 17 shows a practical example of the MM circuit, by which the output pulse width tg of the MM 213 can be controlled on the basis of the dc voltage Eo. This circuit is composed of an MM IC element 214, a time constant capacitor 215 for deciding the pulse width, a pnp transistor 216 for obtaining a constant current, and an emitter resistance 217.

In this circuit, the output pulse width tg can be decided on the basis of the magnitude of the emitter-collector current Ich of the transistor 216 for charging the time constant capacitor 215. In other words, when the current Ich is increased, since the charge-up speed of the capacitor 215 increases, the output pulse width tg is shortened.

Further, the value obtained by adding the voltage (R×Ich) developed across the resistance 217 to the base-emitter voltage Vbe of the transistor 216 is equal to a potential difference between the operating supply voltage E of the circuit and the base voltage Eo. Therefore, when the voltage Eo of the comparator output is reduced, since the current Ich increases accordingly, the output pulse width tg can be shortened.

Figure 18:
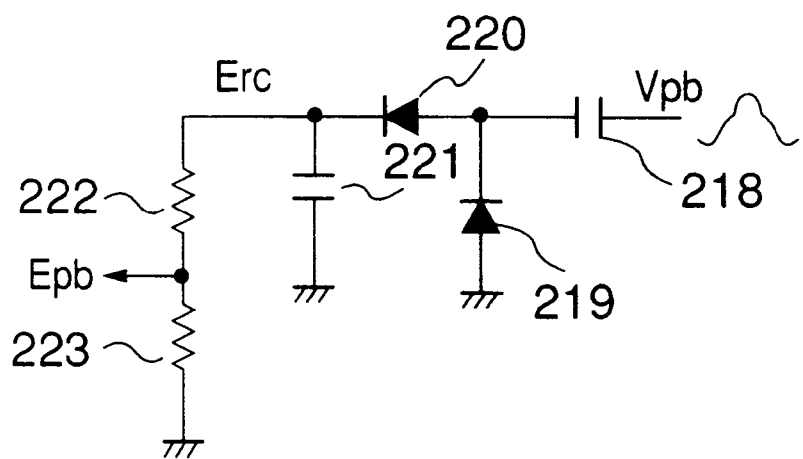
FIG. 18 is another more detailed circuit diagram showing a part of the S-shape correction circuit according to the present invention shown in FIG. 14.

FIG. 18 shows a practical circuit of the detecting circuit shown in FIG. 14, which is composed of an input capacitor 218, two rectifying diodes 219 and 220, and a smoothing capacitor 221, and two voltage dividing resistors 222 and 223. When the voltage Vpb of the S-shape correcting capacitor 203 is applied to one end of the input capacitor 218, since the pp value of this waveform is fullwave rectified by the diodes 219 and 220, a dc voltage Erc develops across the smoothing capacitor 221. This voltage Erc is divided by the two resistors 222 and 223 into an appropriate value Epb suitable as an input to the succeeding stage comparator 209. In this case, it is preferable to set the time constant decided by the capacitor 221 and the two resistors 222 and 223 to a value longer than the vertical deflection period. This is because since the deflecting coil current Iy is usually modulated by the vertical parabolic wave signal due to the correction for the side pin cushion distortion, it is necessary to prevent the components from being superposed upon the voltage Vpb.

In the above-mentioned description, the reference voltage Es shown in FIG. 14 is kept constant, that is, the pp value of the voltage Vpb is kept constant. However, there exists the case where the pp value of the horizontal deflecting coil current Iy is not necessarily constant relative to the horizontal deflection frequency according to the design (i.e., due to the relationship with respect to the blanking time ratio). In this case, since the optimum S-shape correction rate changes, it is preferable to slightly change the reference voltage Es. Here, since the resistance 224 shown in FIG. 14 is connected to the comparator in order to adjust the reference voltage Es, when a voltage Ef generated by an external control circuit and changed according to the horizontal deflection frequency is applied to the comparator 209 through this resistance 224, it is possible to execute the correction in such a way that the reference voltage Es can be adjusted according to the purpose. Further, it is possible to obtain the same effect as above, even if the resistance 224 is connected to the detecting voltage (Epb) side (instead of the reference voltage (Es) side) according to the change rate of the voltage Ef.

What is claimed is:

1. A horizontal S-shape correction circuit, comprising:

an S-shape correcting capacitor group connected in series to a horizontal deflecting coil;

an electronic switch element for controlling connection of a part of capacitors of said S-shape correcting capacitor group, in such a way as to be turned off in a first half of a horizontal scanning period and turned on in a horizontal blanking period;

a detecting circuit for detecting an amplitude of a waveform of a signal generated by said S-shape correcting capacitor group;

a comparing circuit for comparing an output of said detecting circuit with a reference voltage; and a timing control circuit for adjusting the timing at which said electronic switch element is turned off in the first half of the horizontal scanning period, according to an output of said comparing circuit.

2. The horizontal S-shape correction circuit of claim 1, wherein the reference voltage is changed according to a horizontal deflection frequency.

\* \* \* \* \*